Figure 1:
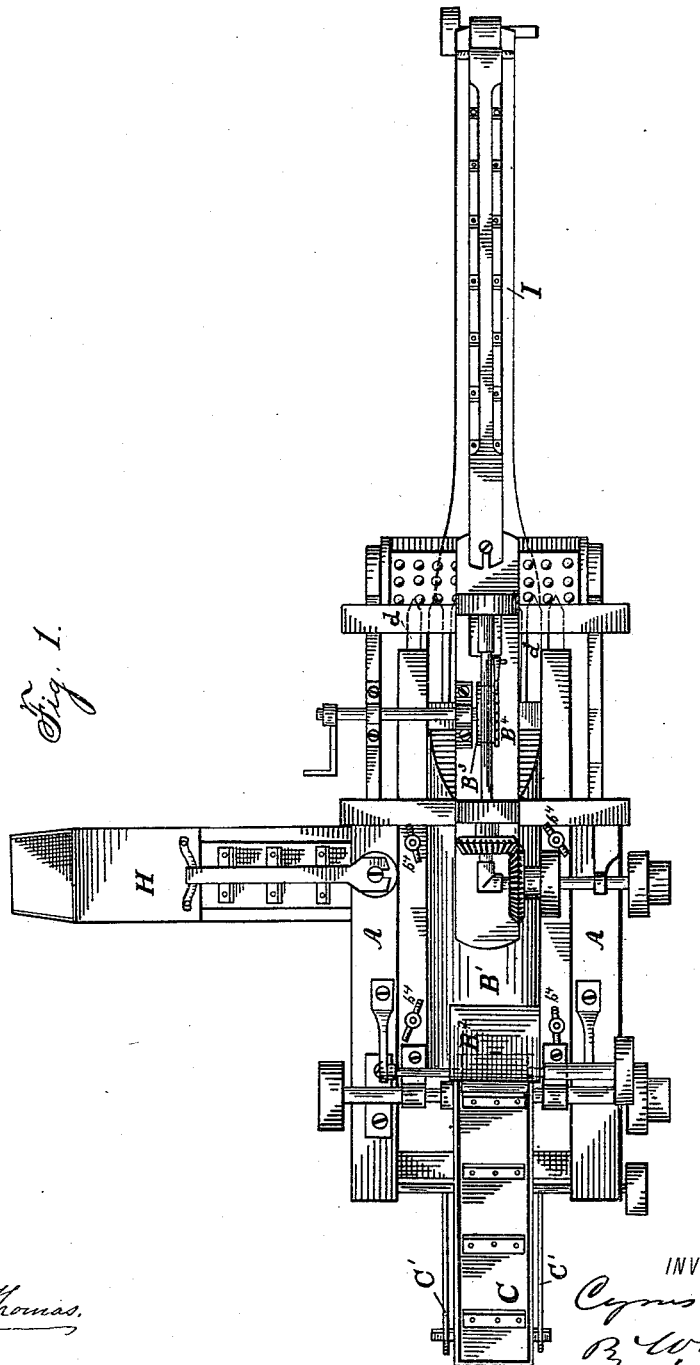

(No Model.) 3 Sheets—Sheet 1.

C. ROBERTS.
COMBINED CORN HUSKER, SHELLER, AND SEPARATOR.

No. 278,824. Patented June 5, 1883.

WITNESSES
Samuel E. Thomas.
W. E. Hoit.

INVENTOR
Cyrus Roberts
By W. W. Leggett
Attorney (No Model.) 3 Sheets—Sheet 2.
C. ROBERTS.
COMBINED CORN HUSKER, SHELLER, AND SEPARATOR.
No. 278,824. Patented June 5, 1883.
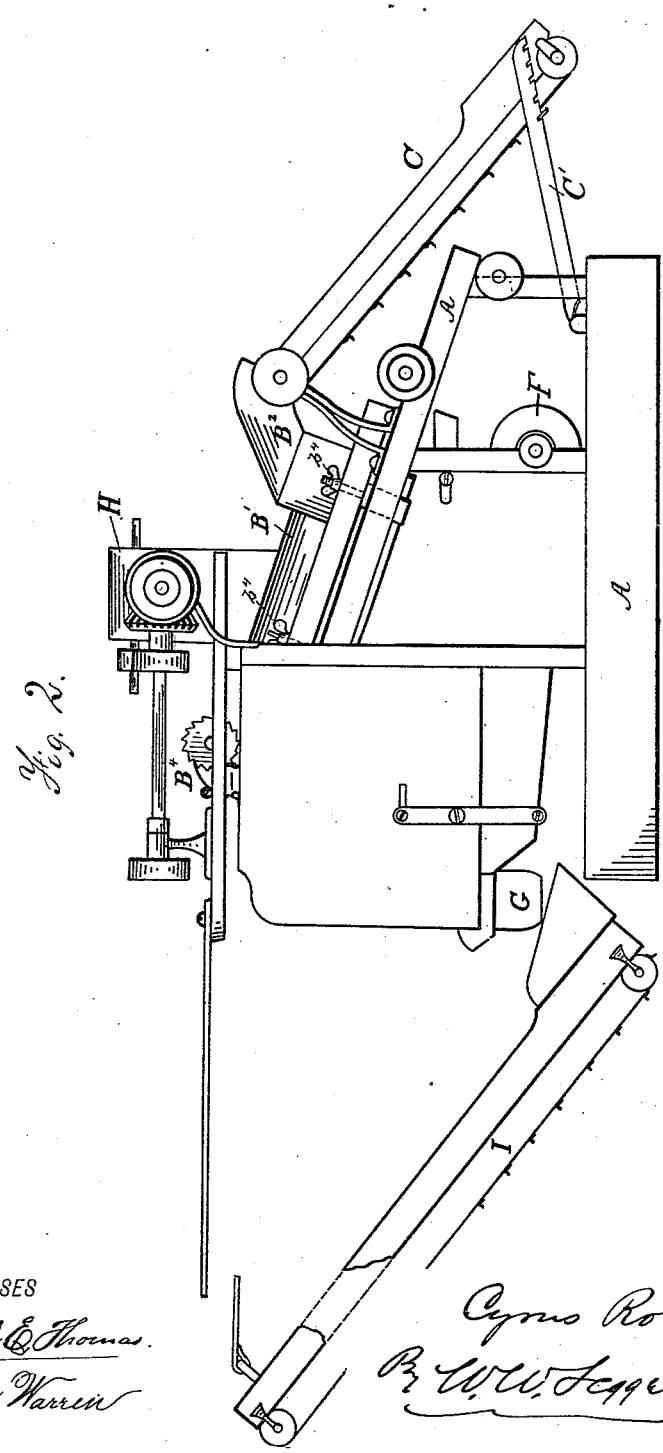

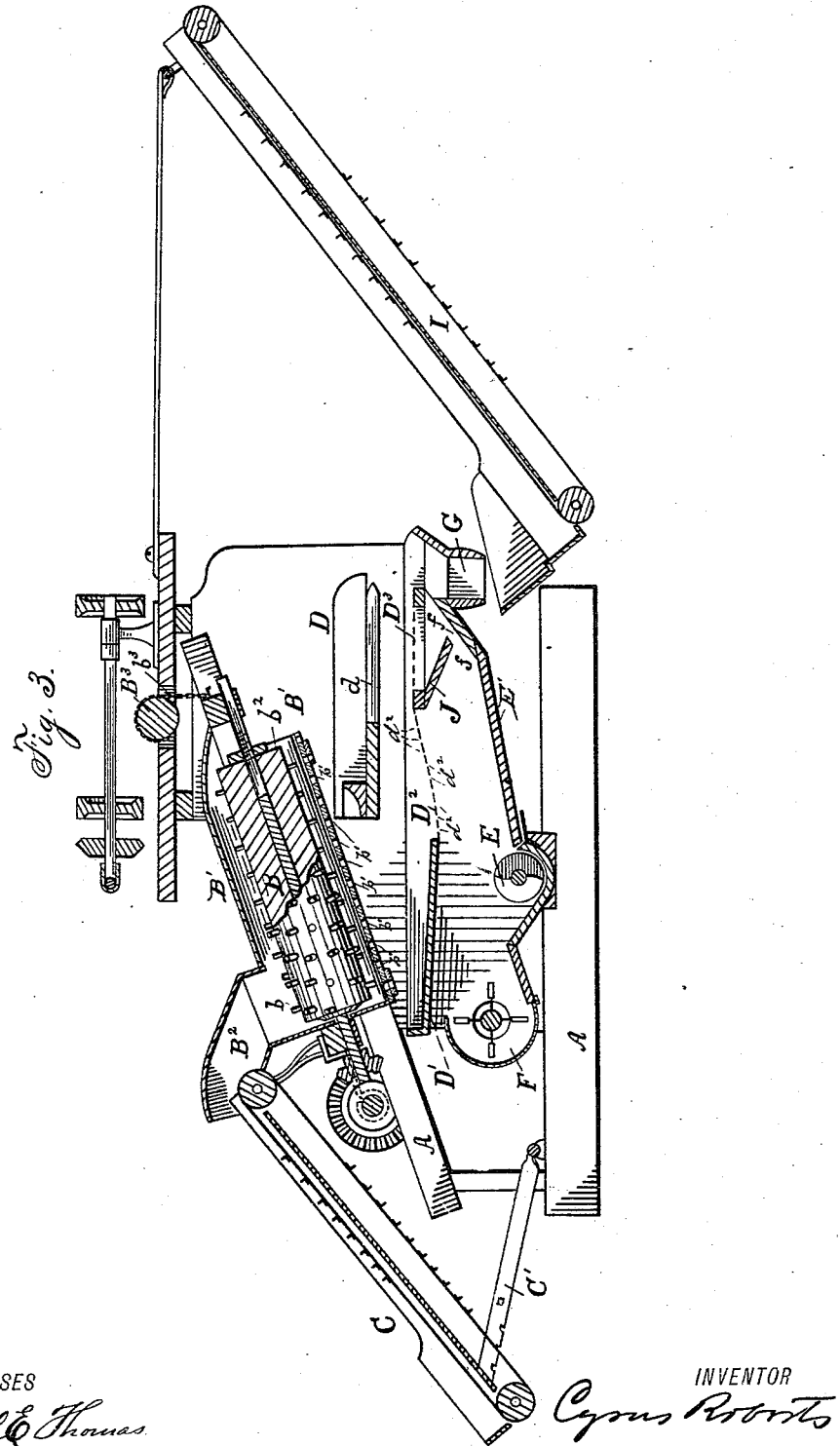

United States Patent Office.

CYRUS ROBERTS, OF THREE RIVERS, MICHIGAN.

COMBINED CORN HUSKER, SHELLER, AND SEPARATOR.

SPECIFICATION forming part of Letters Patent No. 278,824, dated June 5, 1883.

Application filed April 18, 1882. (No model.)

*To all whom it may concern:*

Be it known that I, CYRUS ROBERTS, of Three Rivers, county of St. Joseph, State of Michigan, have invented a new and useful Improvement in a Combined Corn Husker, Sheller, and Separator; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a plan view, Fig. 2 a side elevation, and Fig. 3 a longitudinal central section, of a device embodying my invention.

My invention has for its object the simultaneous husking and shelling of corn, and also the separation of the corn, the cobs, and the husks from each other.

In carrying out my invention, A is a suitable frame-work. B is a toothed husking and shelling cylinder, and B' is a two-part case inclosing the cylinder, said case being divided in or near the plane of its horizontal diameter, and its lower part being adjustable toward and from the cylinder, for a purpose which will be presently explained.

$B^2$ is a hopper, into which the corn on the ear or in the husk is fed to the apparatus. The cylinder and its case are made adjustable about the feeding end, so that the opposite end can be raised or lowered to give to it any desired altitude. The hopper $B^2$ is located at the lower end of this cylinder. The teeth $b$ on the cylinder B are arranged in spiral order, so that in operation the teeth tend to feed the cobs and husks forward. The bottom of the case is perforated to permit the shelled grain to pass through. At $b^2$ the case is left entirely open, so as to permit a perfectly free discharge of the husks and cobs. By thus lifting the discharge end of the shelling and husking cylinder and its case and making it adjustable up and down the corn can be made to discharge quickly or slowly, as desired, so that if it be damp or hard to shell it can be kept under the influence of the sheller for a greater or less length of time, dependent upon its condition.

The adjustment of the cylinder and its case may be effected in any convenient manner—as, for instance, by a plain screw passing through the frame from above and fastened by a swiveled connection to the frame of the cylinder; or, as shown in the drawings, a drum, $B^3$, with a chain, $b^3$, may be employed, and a pawl and ratchet, $B^4$, will suffice to hold it in any desired position. So, also, the lower part or bottom of the case may be adjusted nearer to or farther from the toothed cylinder, by suitable set-screws, $b^4$, to suit larger or smaller cobs and to facilitate the discharge of the husks in various conditions. For instance, if the husks are damp they move sluggishly, and are liable to become wadded and clog the case, and the lower part of the case should be adjusted to give them a free passage, while if they are dry the bottom of the case should be adjusted closer to the cylinder, so that they will not scatter, but come properly under the discharging action of the spiral rows of teeth of the cylinder.

C is a feeding-elevator, which may be raised or lowered along the rack-bar C' to suit any height of granary.

D is a riddle, consisting preferably of long fingers $d$. This is located immediately in rear of the discharge end of the case B', so that the husks and cobs may fall thereon.

D' is an inclined platform, upon which the corn falls as it passes through the orifices in the bottom of the case B'. The corn from this platform is shifted down upon the riddle or screen $D^2$, and passing through the perforations $d^2$ it falls into the seed-trough E beneath.

F is a fan, which directs its main blast up through the perforated riddle or screen $D^2$, although a small portion of the blast is directed out through the channel $f$.

$D^3$ is a perforated riddle or screen, which is formed by arranging a stationary partition, J, near the bottom of the rear portion of shoe E', which forms a continuation of $D^2$, so that whatever corn may be blown or otherwise projected forward beyond the screen $D^2$ will pass through the perforations of the screen $D^3$ and be directed back into the seed-trough.

G is a spout or discharge-orifice for the cobs.

The operation of this device will now be readily understood. Corn in the husk, being fed to the case B' at its lower end, is acted upon by the toothed cylinder, the husks are rasped off from the cobs, and the corn is shelled. The shelled corn passes through the orifices $b'$ in the bottom of the case and falls upon the board $D'$, thence down over the screen or riddle $D^2$. Here it meets a blast from the fan, which blows out dust and fragments of cobs or husks and permits the grain to fall beneath into the seed-trough. Whatever remains of the grain passes through the meshes of the riddle $D'$, and thence back to the seed-trough, while the slight blast through the channel $f$ separates any dust from this point and permits the refuse to pass off the end of the riddle into the cob-exit G. At the same time the cobs and husks are delivered out freely through the open end $b^2$ of the case. These cobs falls upon the riddle D, and if any corn should pass out with the cobs it is shaken through between the fingers $d$ and falls upon the perforated screens beneath. Right at this point, however, as the cobs and husks emerge from the case $B'$ the blast up through the fingers from the fan strikes the mass and blows the husks out of the end of the machine onto the ground, while the cobs passing down upon the rake-fingers are shaken back over the end of the fingers and into the cob-discharge G. It is thus seen that the machine effects the removal of the husks and the shelling of the corn, and the separation of the corn, the husks, and the cobs from each other, and provides for the proper adjustments of the husking and shelling mechanism to accommodate different sizes of cobs and the different character of the grain that is being acted upon.

H is an elevator, which may be located at either end of the seed-trough for elevating the corn to the bags or other receptacles.

I represents an elevator located at the discharge end of the cob-spout G. This elevator is so arranged that it may be directed off to the right or to the left of the machine at will; or it may be led off directly to the rear of the machine, if desired, although this latter arrangement is undesirable, except in cases where the corn that is being operated upon has been already husked. The machine is capable of treating the corn which has been husked as well as with the husks on. When it operates as a husker as well as a sheller the elevator I should be led off either to the right or left.

I prefer to give to the riddle D a counter movement to that of the parts $D'$, $D^2$, and $D^3$, so as to neutralize the vibrations of the machine. This, however, is not essential.

Within the shoe is a partition, J, which separates the riddle $D^2$ from the riddle $D^3$, so that the main blast passes through the riddle $D^2$. Whatever grain passes over this riddle onto the riddle $D^3$ finds the blast at this point cut off and the grain readily drops through upon the part J, and passing down over the end of this board meets at the throat $j$ the blast which emerges from the throat $f$. This effects a final separation and prevents the seed which passed over from being wasted.

I claim—

1. In a corn-sheller, the combination, with the inclined rotary shelling-cylinder provided with spiral rows of teeth, of the inclined case surrounding said cylinder and having a feed-opening at its lower end and a discharge opening below the cylinder at its upper end, substantially as and for the purpose set forth.

2. The combination, with the inclined shelling-cylinder and the case having a free discharge below the cylinder at its upper end, of means for adjusting the upper ends of the cylinder and case at the same time without changing their positions with relation to each other, substantially as described.

3. The combination, with the cylinder B and the casing having its bottom perforated for the escape of grain and its end open below the cylinder for the discharge of husks and cobs, of the platform $D'$, riddle $D^2$, the riddle D, arranged under the discharge end of the casing, the riddle $D^3$, the fan F, and the stationary partition J, separated from the bottom of shoe $E'$ by a channel, $f$, all arranged and operating as specified.

4. The combination, with the rotary inclined shelling-cylinder having spiral rows of teeth, of the two-part inclosing-case having its lower portion adjustable toward and from the cylinder, and having a free discharge below said cylinder at its upper end, substantially as and for the purpose set forth.

In testimony whereof I sign this specification in the presence of two witnesses.

CYRUS ROBERTS.

Witnesses:
J. EDWARD WARREN,
N. S. WRIGHT.